United States Patent [19]

Lewis

[11] 4,344,076
[45] Aug. 10, 1982

[54] FEEDBACK SENSOR FOR REMOTE RECEIVER IN A POWER TRANSMISSION SYSTEM

[75] Inventor: Terence O. Lewis, Roswell, Ga.

[73] Assignee: Sangamo-Weston, Inc., Atlanta, Ga.

[21] Appl. No.: 53,252

[22] Filed: Jun. 29, 1979

[51] Int. Cl.³ ............................................... H04Q 9/00
[52] U.S. Cl. ........................... 340/825.17; 340/825.64
[58] Field of Search ............... 340/163, 164 R, 164 A, 340/310 R, 310 A, 151, 172, 502, 538, 503, 504, 171 R, 147 SY; 178/4.1 R, 4.1 B; 370/48

[56] References Cited

U.S. PATENT DOCUMENTS

| | | | |
|---|---|---|---|
| 3,488,632 | 1/1970 | Clark | 340/172 |
| 3,751,592 | 8/1973 | Blouin | 340/310 R |
| 4,086,570 | 4/1978 | Wakasa et al. | 340/538 |
| 4,099,161 | 7/1978 | Wolski | 340/167 R |
| 4,135,101 | 1/1979 | Young et al. | 340/310 A |
| 4,156,105 | 5/1979 | Weisner et al. | 178/34 |

Primary Examiner—Donald J. Yusko
Attorney, Agent, or Firm—Leydig, Voit, Osann, Mayer & Holt, Ltd.

[57] ABSTRACT

A feedback sensor which detects the reception of pulses and the response thereto by the remote receivers of a load management system associated with a power transmission system. The receivers are of the type which respond to pulsed messages injected onto the power lines and include electomechanical elements operative upon receipt of pulses for which the particular unit is coded. An optical switch is fixed to the receiver and a shutter to the actuating member such that the optical switch is caused to change state whenever the receiver responds to a transmitted pulse. The detected signal is returned to the injection station, such as by telephone lines, to verify proper response of the receivers in the system. A unit located at the injection station can be used to assure that the signal is being injected properly.

2 Claims, 8 Drawing Figures

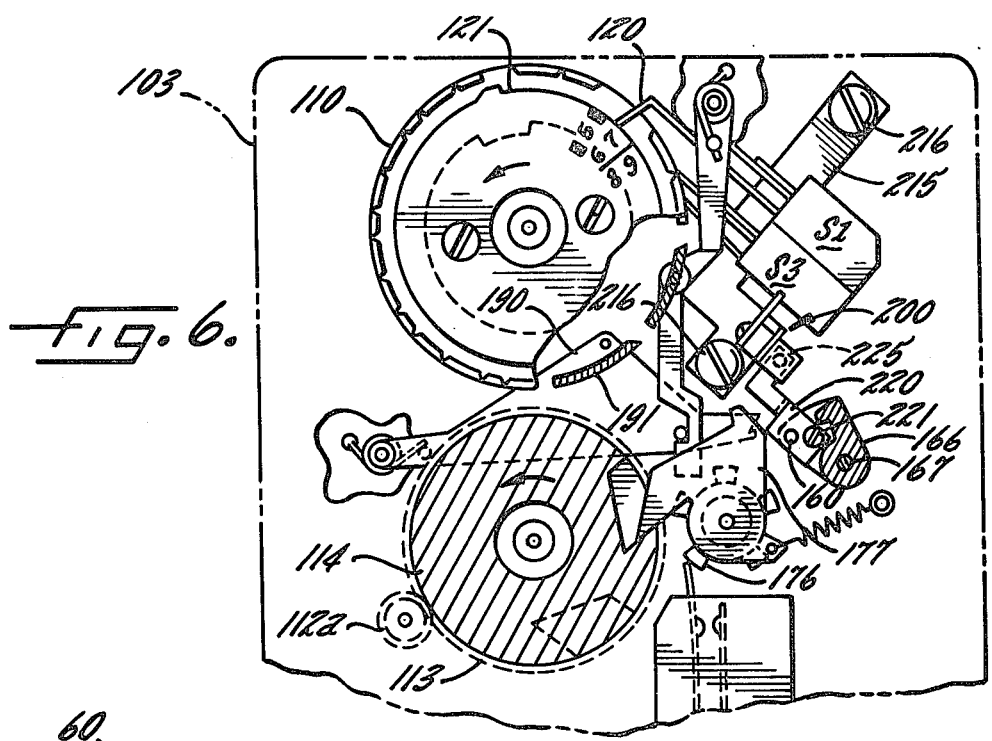

FEEDBACK SENSOR FOR REMOTE RECEIVER IN A POWER TRANSMISSION SYSTEM

This invention relates to power transmission systems, and more particularly to a receiver having a feedback detector for reporting receipt of coded messages.

Centralized load management systems for power transmission provide the utility company with a number of useful features including the ability to automatically switch loads at remote stations in the system. For example, through control of deferable loads the utility company can reduce peak kilowatt demands, through control of multiple register tariff meters can accomplish time-of-day metering, or through control of capacitor banks can accomplish power factor correction. Since the receivers are connected to the power lines for control of their associated loads, it is convenient to transmit coded messages right on the power lines for detection by the receivers. In one example the code utilized is a pulsed code having a plurality of pulse positions, the pulses comprising bursts of audio frequency tone inductively coupled to the power lines. The receivers are normally idle, but respond to a start pulse to drive a series of gears, cams and the like in synchronism with the incoming signal. The receivers are coded to respond to pulses in particular positions such that the nature of the signal and the positions in which the pulses appear determine which receiver or receivers will take what type of action.

Because the receivers operate in remote locations insofar as the utility company is concerned, the utility company is limited in its ability to insure that the commanded action has been taken.

In addition, the substation equipment at which coded messages are injected onto the power lines, can be operated unattended. Because a number of types of faults can develop in the signal injection circuitry, it is not always possible to know if the signal is being properly injected.

In view of the foregoing, it is an object of the present invention to provide a remote receiver having a feedback sensor to verify the reception of pulses at the receiver and the mechanical action resulting from such reception.

According to another aspect of the invention, an object is to provide a signal monitor at the injection station to assure that the signal is being properly injected.

Other objects and advantages will become apparent from the following detailed description when taken in conjunction with the drawings in which:

FIG. 6 is a fragmentary view showing the feedback sensor in operated position;

FIG. 7 is a fragmentary perspective view illustrating the operation of the feedback detector.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
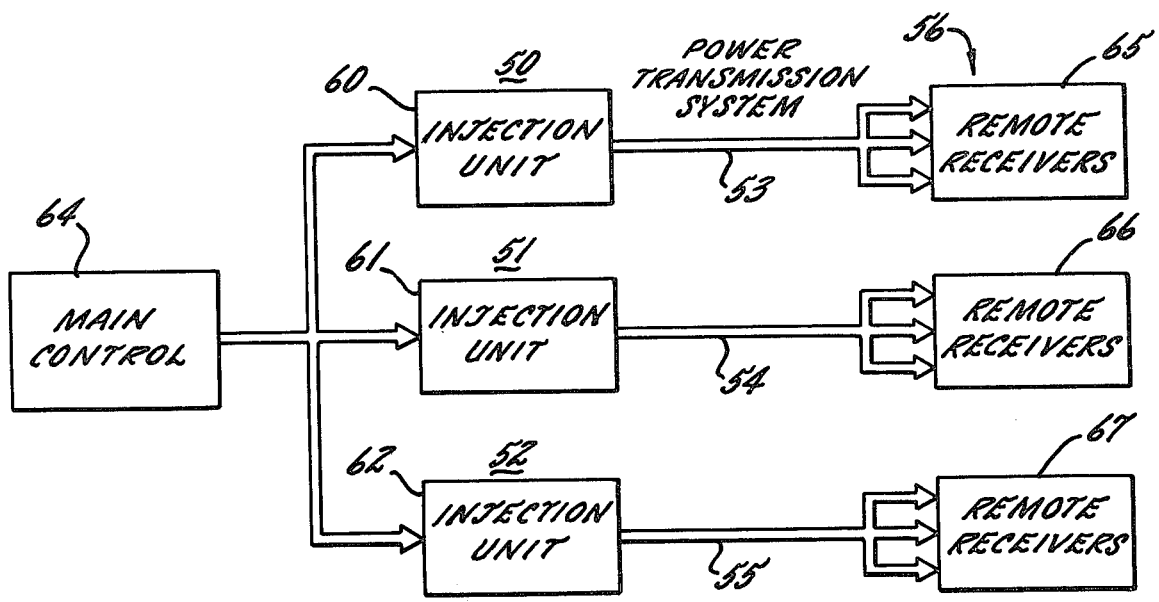
FIG. 1 is a block diagram illustrating the application of a centralized load management system to a power transmission system.

Turning now to the drawings, FIG. 1 diagramatically illustrates a portion of a power transmission system and the association of a load management system therewith. In the usual manner a plurality of substations 50-52 are provided with appropriate transformers, protective devices and the like and are connected via power lines 53-55 to the various user locations indicated generally at 56.

The load management system is associated with the power transmission system and is adapted to exercise control over loads at the user locations 56. To that end injection units 60-62 are associated with the respective substations 50-52. The substation injection units 60-62 are connected to a main control 64 at which control actions are initiated. Signals are sent by the main control 64 to the injection units 60-62, addressing one or more of the injection units and informing the addressed unit of the action to be taken. In response the injection unit or units configure a digital message and inject such message onto power lines of the power transmission system for detection by remote receivers 65-67 at the user stations 56. Typically, the signal is injected by transformers coupling tone bursts of predetermined frequency at the substation for transmission down the power lines. All of the receivers monitor the code being injected while only those which are preset to respond to the particular code actually do respond to accomplish the desired control function.

Although it is not essential to the practice of the invention, it is preferred to use a remote receiver as described in Patton U.S. Pat. No. 4,291,236, issued Sept. 22, 1981, and assigned to the same assignee as the present invention. The receiver will be briefly characterized in the following, in sufficient detail for an understanding of the present invention. However, for a fuller explanation of all details of the receiver, the reader is referred to the aforementioned application, the disclosure of which is incorporated herein by reference.

Figure 2:
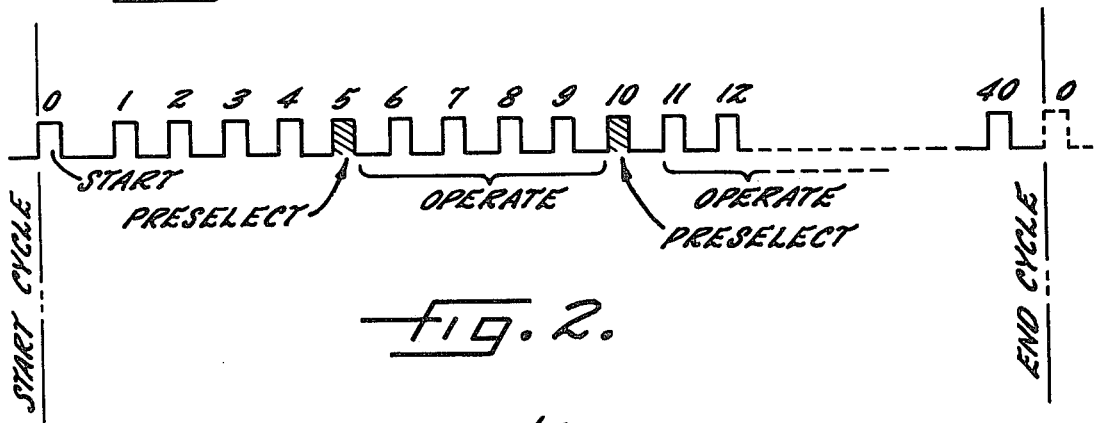
FIG. 2 illustrates the nature of the coded messages.

Briefly, the receiver is arranged to respond to a multi-part code adapted to first start a receiver then arm a started receiver as a precondition to allowing response to operate pulses. The particular code is schematically illustrated in FIG. 2 including a start pulse 0 which initiates a cycle of all receivers receiving the code, and 40 equally spaced pulse positions 1-40 which carry the coded message. The pulses are audio tone bursts of predetermined duration, having a frequency of, for example, 340 Hz. The start pulse 0 initiates a cycle of all receivers and places then in synchronism with the coded message to follow. With the exception of pulse 40, the pulse positions which are multiples of 5 are used as preselect pulses adapted to arm receivers coded for the appropriate preselect pulse. With the exception of pulse positions 1-4, the remaining pulse positions are all operate pulses which serve to switch the load at associated receivers which have properly been armed by an appropriate preselect pulse.

Figure 3:
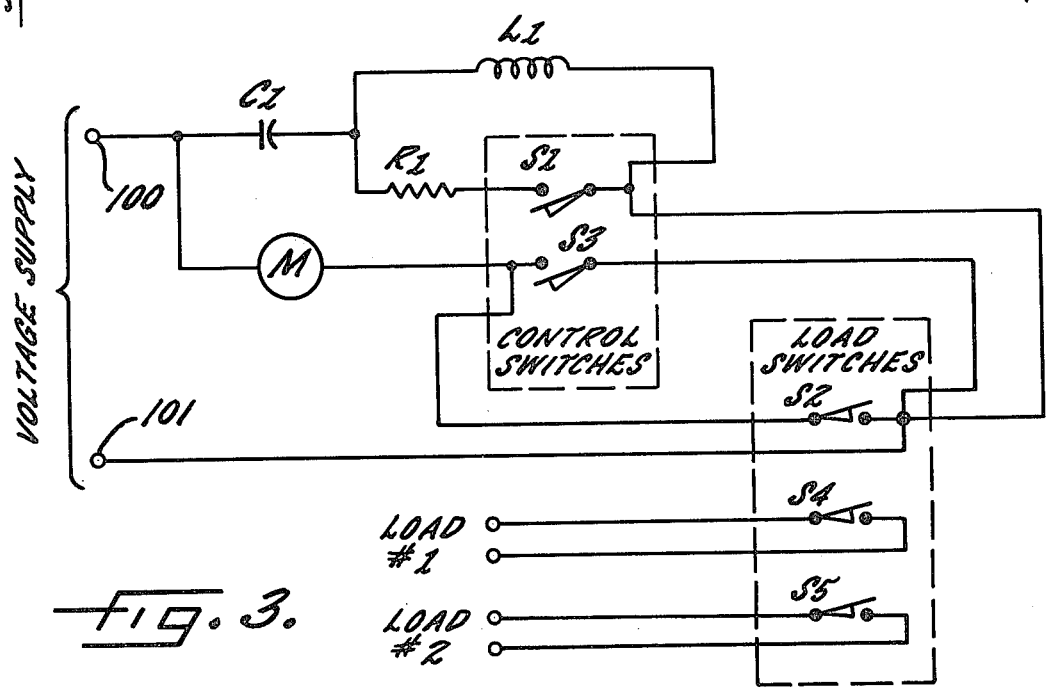
FIG. 3 is a diagram illustrating the circuitry of a remote receiver unit.

The electrical structure of the receiver is shown in FIG. 3 including a pair of terminals 100, 101 for connection to the power line. A pair of cam operated switches S2, S3 control the application of power to a motor M. When either of the switches S2 or S3 is closed, power is applied to the motor causing it to rotate. The motor is of the synchronous variety to synchronize the receiver with the timing of the incoming message. A tuned circuit comprising capacitor C1 and inductor L1 is tuned to the frequency of the audio tone imposed on the line, in the present example 340 Hz. A cam operated switch S1 when closed connects a resistor R1 across the coil L1 so as to detune the circuit and prevent it from responding to the 340 Hz signal. Output devices comprising a pair of load switches S4 and S5 are provided for controlling Load Number 1 and Load Number 2 connected to the receiver.

Figure 5:
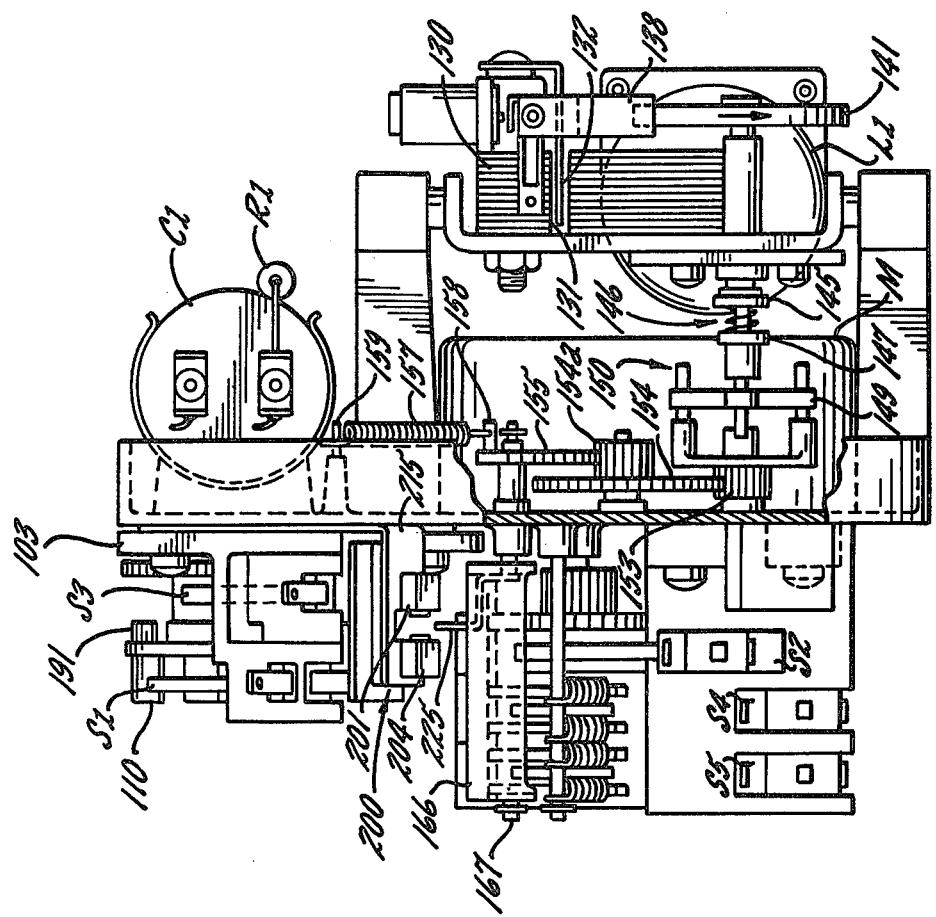
FIG. 5 is a side elevation taken along the line 55 of FIG. 4.
Figure 4:
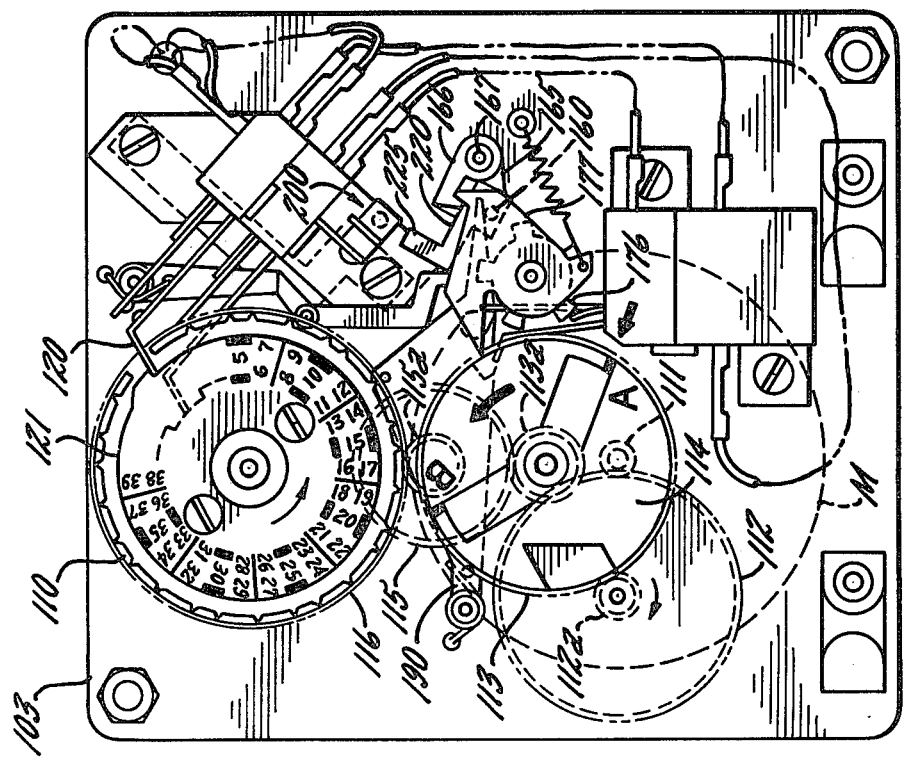
FIG. 4 is a front elevation showing a remote receiver exemplifying the present invention.

Turning now to FIGS. 4–6, there is shown the mechanical configuration of the remote receiver including the elements described in connection with FIG. 3, mounted in appropriate locations on a base plate 103. Means are provided for coding a receiver, shown herein as code cam 110 driven from the synchronous motor M. Driving is accomplished via a gear train including a motor pinion 111 driving a first pair of intermediate gears 112, 112a. Gear 112a in turn drives a pair of gears 113, 113a which are physically attached to a mode select and load switch operating cam 114. In addition, gear 113a drives an intermediate pair comprising gears 115, 115a, which in turn drives gear 116 connected to the code cam 110. The gear ratio causes the output cam 114 to make nine complete revolutions for each revolution of the code cam 110.

As shown in FIG. 4, the code cam 110 bears numbers corresponding to the pulse positions illustrated in FIG. 2, and the cam can be coded by breaking off the appropriate tabs. The operating arm 120 of switch S1 will then fall to the surface of the code cam when the cam is in the appropriate position, allowing a pulse, if present in the signal, to be received. The cam is synchronously driven so that the actuator of switch S1 is opposite the cam position corresponding the pulse position then being received.

In order to detect the audio frequency tone pulses injected onto the power lines, the receiver includes tuned circuitry responsive to the particular frequency utilized, in the present example 340 Hz. As described in greater detail in the aforementioned application, the tuned circuitry includes coil L1 which is wound on a core 130 having an air gap 131. Within the air gap is situated a drive plate 132 to which is affixed a vibrating blade 133 (see FIG. 8).

Recalling that the coil L1 is an element of the circuit which resonates in response to receipt of a 340 Hz pulse, it will be appreciated that a magnetic field is set up in the gap 131 at the resonant frequency during the duration of such pulse. The field acts on a drive plate to cause the blade 133 to vibrate. A spring arm 138 is affixed to the free end of the blade 133 such that vibration causes intermittant interference with the rubber surface 140 of a drive wheel 141, rotating the wheel in the direction shown by the arrow.

A shaft 142, fixed to the drive wheel 141, is also fixed to a first member 145 of an overrunning clutch generally indicated at 146. The second clutch member 147 in turn is connected to a first member 149 of a flexible coupling 150, and the second member 151 of the coupling 150 is affixed to a drive gear 152. The drive gear 152 drives through a pair of intermediate gears 154, 154a to a gear sector 155. A spring 157 connected between a pin 158 of the sector and a fixed pin 159 biases the sector in the clockwise direction to a rest position. Rotation of the wheel 141 overcomes the force of the spring 157 to translate the sector gear from the rest position to a counterclockwise advanced position.

Figure 8:
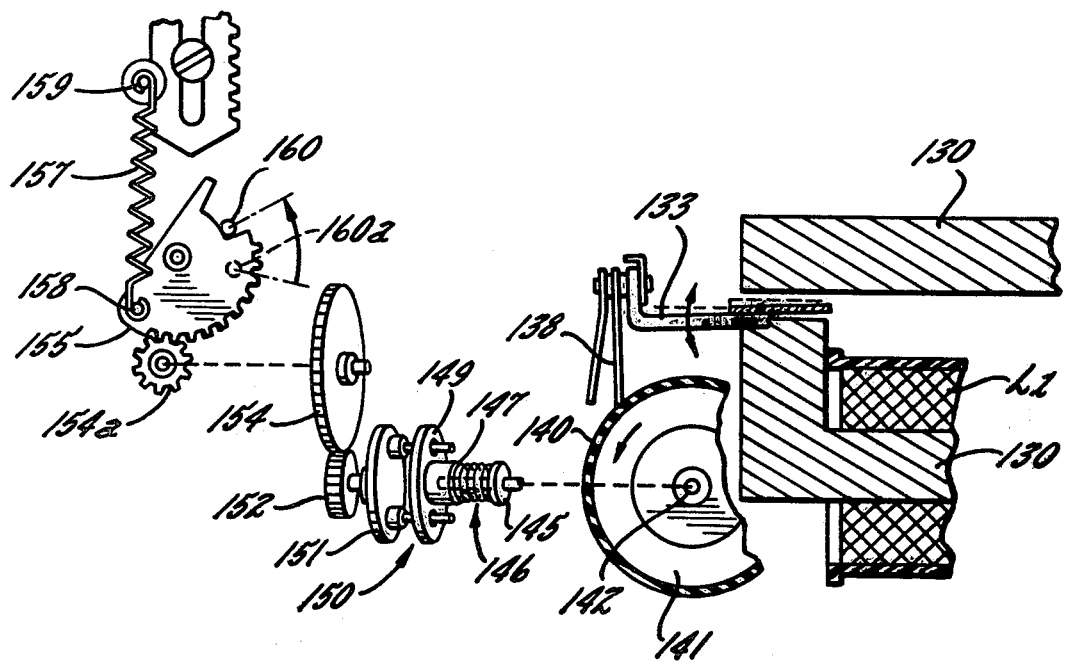
FIG. 8 is a fragmentary view, partly exploded, showing the receiver actuator and associated elements.

As best shown in FIG. 8, the gear segment 155 has a U-shaped slot in the periphery thereof for engaging a pin 160. The solid line showing of pin 160 illustrates the advanced pin position when the segment 155 is rotated by actuation of the frequency responsive circuit, whereas the dotted position 160a illustrates the rest position with the segment 155 in the home position under the urging of spring 157.

As shown in FIG. 4, the pin 160 projects through the base plate and is affixed in the base 165 of a lever latch assembly 166. The lever latch assembly 166 is pivoted at 167 such that raising of the pin from the illustrated home position rotates the lever latch assembly in the clockwise direction.

As described in the aforementioned Patton application, the receiver also includes means for detecting a preselect pulse, and preventing response to operate pulses until the receiver is armed by a preselect pulse. Suffice it to say for the moment that an artuate lever 190 cooperates with a cam 191 on the lower surface of the code cam 110 to arm the receiver if the coded preselect pulse is detected and to prevent response to an operate pulse whenever the receiver is not armed. The details of that operation are not important to an understanding of the present invention and the reader is referred to the aforementioned Patton application for a fuller description thereof.

As noted at the outset, the purpose of the receiver is to control a load, a rate meter or the like. To that end a pair of switches S4, S5 (switch S5 being shown in FIG. 6) are adapted to be opened or closed by the receiver in response to detection of the message for which the receiver is coded. FIG. 6 shows the operating mechanism for actuating the switches, the lever latch 166 having been released in response to detection of an operate pulse, allowing a pawl 177 to fall into a recess on the output cam 114. Continued rotation of the cam wheel 114 forces the pawl back to its rest position, that action causing the rotation of a star wheel 176, releasing the left most contact member of the switch S5 such that the switch is allowed to close.

With the foregoing in mind, it will be appreciated that the lever latch 166 is a mechanical element which responds by moving in a predetermined manner whenever a pulse is decoded and detected by the receiver.

In accordance with the invention, means are provided for detecting such response and reporting the detected response to a central station as an indication of appropriate operation. When a receiver with feedback is utilized at a remote receiver location, the response can be reported back via telephone lines to the injection unit, as will be described below. However, it is also advantageous to utilize a feedback receiver right at the injection unit for the purpose of assuring the integrity of the transmitted signal. An alarm device attached to that receiver (which can be set to respond to any or all codes) serves to assure that the signal is indeed being injected into the line. If the receiver at the injection unit fails to detect pulses, an immediate signal is available and appropriate action can be taken.

In practicing the invention, detector circuitry is associated with the receiver for detecting mechanical operation thereof, such detector circuitry being shown herein as a photocoupler generally indicated at 200. The photocoupler includes a first chamber 201 having a light emitting diode (LED) 202 positioned therein adapted to illuminate a photosensitive element 203 in a chamber 204. A small gap 205 separates the source from the sensor. The assembled elements are mounted on a bracket 215 which, as shown in FIG. 6 is secured to the base plate by means of a screw 216 also holding the switch block S1, S3 in place.

Connections are routed from the LED and the photosensor to a feedback interface 211 adapted to power the LED and to monitor the photosensor output to detect whether or not light is being received. The feedback interface can be of any conventional design adapted to impose logic levels or tones on a transmission medium such as telephone line 210 indicating actuation of the receiver. The telephone line returns the signals to the injection unit at the substation. Alternatively, when the receiver is mounted right at the substation, the feedback interface can be a part of the injection unit. It is well within the skill of the art to properly bias a photosensitive element such as a phototransistor and sense the logic level output thereof to determine whether or not the phototransistor is being illuminated.

Further in practicing the invention, the lever latch 166 has mounted thereon a shutter bracket 220. The bracket has an aperture fitting over the pin 160 and a further aperture which receives a screw 221 mounting the bracket to the base 165 of the lever latch 166. The shutter bracket includes a pair of right angled bends which dispose a shutter arm or blade 225 generally parallel to the plane of the lever latch base but located in the plane of the gap 205 of the optical coupler. In the rest position shown in solid lines in FIG. 7 the shutter blade 225 remains clear of the optical coupler such that light from the LED impinges on the photosensor producing a low logic level in the feedback interface indicating the receiver is inactive. However, whenever a pulse is received and detected by the receiver, the lever latch 166 will rotate to the dashed line position, causing the shutter blade 225 to assume its dashed line position within the gap 205, thereby interrupting the light from the LED to the photosensor. A high logic level will be sensed in the feedback interface, signaling that a pulse has not only been received but also responded to. That signal can be coupled back on the telephone lines 210 to the injection unit 60.

It is worthwhile to further note the advantages attendant to mounting a receiver at the injection unit for monitoring the integrity of the signal being injected onto the power lines. Simply monitoring the operability of the pulse generating circuitry is not completely effective because the injection circuitry, fuses and other downstream equipment is not monitored. It is possible in theory to inductively couple a monitor to the power line to sense the nature of the signal thereon. That approach can be expensive and is subject to reliability problems.

To overcome those problems the present invention provides a feedback receiver as described above coupled to the power lines for simply monitoring the signal injected onto the lines. Conveniently, such receiver can be located right at the injection unit substations. Rather than code the receivers with preselect and operate codes as conventional, the monitor receivers can be coded to respond to a larger number of pulse positions. In fact, all tabs can be broken away, making the receiver an "all code" monitor which responds to all pulses imposed on the line, irrespective of position. As a result, the optical coupler will typically sense three pulses during each transmission cycle and will thus provide a signal at the feedback interface 211 indicating that the injection circuitry is working. The fact that the signal monitor is a unit with characteristics just like the receiver in the system, provides valuable information not only that a signal is being injected, but also that the injected signal is capable of driving a receiver.

Alternatively, some of the decoding mechanisms may be entirely eliminated from the monitor receiver unit so that the optical coupler will sense all signals on the lines which are at the proper frequency such as 340 Hz. This would reduce to cost of a monitor receiver unit while providing much of the same injection information.

I claim as my invention:

1. In a power transmission system of the type in which pulse coded messages are injected onto the power lines for signaling control functions, said system having a plurality of receivers connected to the power lines, each receiver being coded to respond to particular ones of the pulses in the messages, said receivers including means for detecting the pulses for which they are coded and for actuating mechanical means in response thereto, an improved signal injection monitor comprising a receiver coded to respond to substantially all of the pulses in the messages, an optical coupler mounted on the receiver and a shutter mounted on the receiver, one of said elements being mounted on the mechanical means so as to define a first position wherein the shutter interrupts the optical coupler and a second position where the optical coupler is not interrupted, said first and second positions being defined by the actuated and unactuated conditions of the mechanical means, and means monitoring the optical coupler to detect the response of the receiver to pulses as they are injected onto the power lines.

2. In a power transmission system including means for injecting pulse coded messages on the power lines for signaling, each message having a plurality of defined pulse positions, a plurality of receivers connected to the power lines and coded to respond to pulses in selected ones of said pulse positions, each receiver including mechanical means for producing mechanical motion upon detection of the pulses for which it is coded, an improved signal injection detector comprising a receiver coded to respond to pulses in substantially all of said pulse positions, said receiver being connected to the power lines downstream of the means for injecting, said receiver including feedback means for detecting motion of the mechanical means, said feedback means including an optical coupler and a shutter, one of said elements being affixed to the mechanical means for interrupting the optical coupler in response to said motion, and means monitoring the optical coupler for determining that the injected messages are capable of operating said receiver.

* * * * *